United States Patent

[11] 3,537,642

[72] Inventor William Laurita
343 E. Walnut St., Kutztown, Pennsylvania 19530
[21] Appl. No. 700,241
[22] Filed Jan. 24, 1968
[45] Patented Nov. 3, 1970

[54] AVERAGING DEVICE
3 Claims, 5 Drawing Figs.
[52] U.S. Cl. ..................................................... 235/61,
177/1, 35/48
[51] Int. Cl. ..................................................... G01d 1/02,
G01g 19/00
[50] Field of Search ........................................... 235/61(E);
35/48; 177/1, 126, 216, 251

[56] References Cited
UNITED STATES PATENTS
3,382,941  5/1968  Novak ........................... 177/1

Primary Examiner—Stephen J. Tomsky
Attorney—Richard O. Church

ABSTRACT: A simple and readily portable device for computing averages is disclosed, in which an axle is mounted for rotation and weights are hung on the axle at varying distances from its center of gravity. The distance that the center of gravity of the weight is displaced from the axis of rotation is related to a numerical value, so that when a number of weights are placed on the axle, the axle will rotate until the moment arms are balanced. The device is calibrated so that the angular displacement of the axle at equilibrium conditions will indicate the desired average.

Patented Nov. 3, 1970  3,537,642

INVENTOR
WILLIAM LAURITA
BY Richard O. Church
ATTORNEY

INVENTOR
WILLIAM LAURITA
BY
ATTORNEY

AVERAGING DEVICE

BACKGROUND OF THE INVENTION

1. Field of the Invention

This invention generally relates to improved methods and apparatus for computing averages. More particularly, this invention is concerned with a simple, inexpensive and compact device useful in determining the average of a large group of numbers and for determining average deviation. In one preferred embodiment, the apparatus of this invention finds particular utility in use by teachers for determining student grade averages and in establishing letter grades by obtaining the average deviation of a number of grades and relating it to the standard deviation in a normal distribution. It is to be understood, however, that the invention may have many other uses where an average of a group of numbers is to be determined, and to this extent, this invention is not limited to the averaging of grades.

2. Description of the Prior Art

Many devices have long been available for the computing of averages. The accurate devices which may be used for this purpose may be broken down into mechanical calculating machines useful to obtain sums, differences, products and quotients, and electronic computers.

While calculators are extremely efficient and accurate, they are incapable of storing information, except on a momentary basis. Thus, each time it is desired to obtain an average, it is necessary to feed all of the information back into the machine and to repeat the calculating operation. Where it is necessary to deal with the same numbers on repeated occasions, a considerable duplication of effort is required because of the inability of the calculator to store the information for later retrieval.

In recent years, electronic computing devices have become available that not only can perform all types of mathematical operations, but also are capable of storing vast quantities of information for instantaneous retrieval in any desired form. While such devices are fully capable of performing the operations to which this invention is addressed, such devices are prohibitively expensive if used only occasionally, are large in size, must be permanently installed, and are not portable or capable of being conveniently placed on a desk.

It has been found that through the use of the methods and apparatus of the instant invention, the numerical data comprising the information to be stored may be conveniently and economically stored on cards on which the specific numerical information contained is encoded on the cards by placing of a distinctive slot or notch in the card. A series of cards so encoded, when mounted on the device of this invention, will balance on the axle of the device and provide an indication on the meter of the device of the numerical average of the numbers encoded on the cards.

SUMMARY OF THE INVENTION

Accordingly, it is an object of this invention to provide an improved and simplified apparatus for calculating averages.

Another object of this invention is to provide a device for calculating averages that utilizes as its input a series of cards on which information has been encoded.

Yet another object of this invention is to provide a small, lightweight, readily portable, and inexpensive device that may be utilized for computing averages and which utilizes previously recorded and stored information as its input.

Briefly, these and other objects of this invention are achieved by mounting an axle for rotation about a horizontal axis and associating therewith an indicator device calibrated to designate a numerical value. The center of gravity of the axle and its associated indicator device is adjusted to lie along the axis of rotation. The cards of this invention each bear a single notch or slot, the location of which in relation to the center of gravity of the card, varies in accordance with the numerical information encoded thereon. A series of cards bearing numerical information encoded on the cards in this manner is then positioned on the axle with the center of gravity of each card being below the axis of rotation. The axle is then permitted to rotate freely until the composite center of gravities of the cards hung on the axle lie in a vertical plane passing through the axis of rotation and the computed numerical value is designated by the indicator device.

DESCRIPTION OF THE DRAWINGS

The invention can be better understood in connection with accompanying drawings, in which:

With more specific reference to the drawings, FIG. 1 shows the apparatus 1 of this invention, comprised of an upstanding front support 2 and an upstanding back support 3. Both the front support 2 and the back support 3 are vertically positioned upon and held by a base element 4. Horizontally disposed between the front support 2 and the back support 3 is an axle 5 that is journaled for rotation adjacent its opposite ends by a front bearing 6 and a rear bearing 7.

Figure 1:
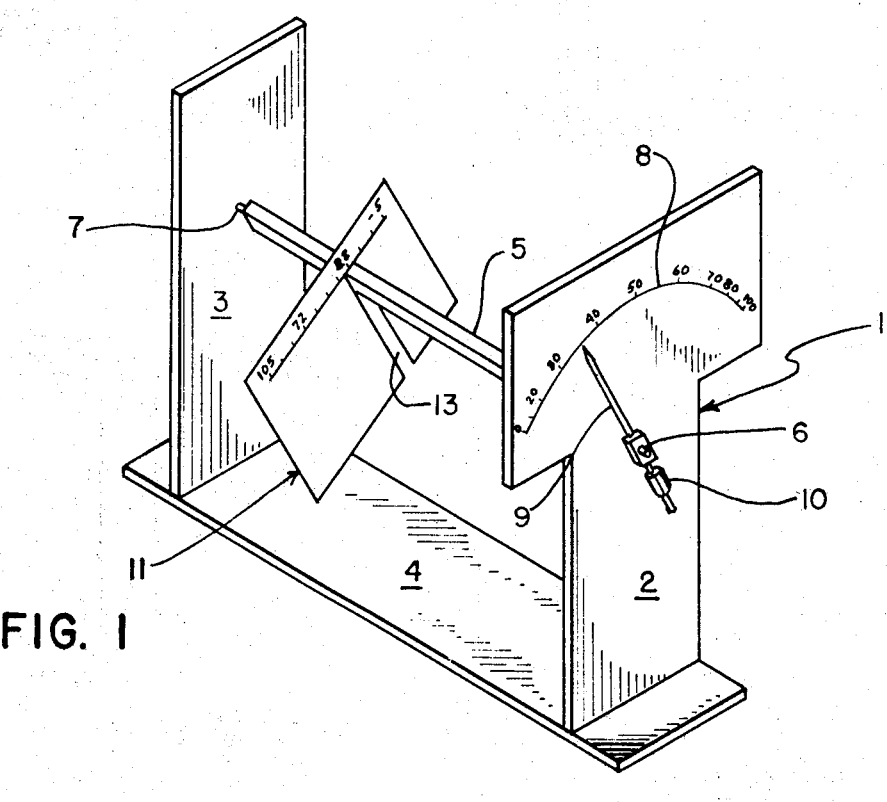
FIG. 1 is a perspective view of a preferred embodiment of the apparatus of this invention.

The upper face of the front support 2 includes a series of numbers that make up an averaging scale 8. A pointer 9 is fixedly attached to the axle 5 so that the axle and pointer will rotate together. The pointer 9 and the scale 8 are cooperatively arranged so that the pointer will indicate a specific numeral on the scale 8.

As will later become apparent, it is important that the combined center of gravity of the axle 5 and the pointer 9 lie substantially along the axis of rotation of the axle 5. For ease in obtaining this center of gravity, an adjustable weight 10 is provided at one end of the pointer 9. As the weight 10 is moved toward or away from the center of rotation of axle 5, the center of gravity is changed. When the adjustable weight 10 is in its proper position, there will be no unbalanced forces that will tend to cause the axle 5 and the attached pointer 9 to rotate.

Figure 2:
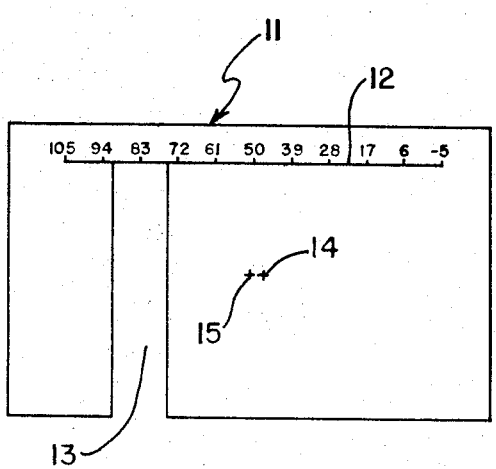
FIG. 2 illustrates, in front elevation, a card for recording information suitable for use in this invention.

A card 11 is shown supported on the axle 5 and can best be described with reference to FIG. 2. As here illustrated, although not necessary in the practice of this invention, the card 11 is comprised of a heavy piece of cardboard or plastic, having a generally rectilinear shape. The card is provided with a scale 12 extending from numbers −5 to 105, although any desired range of numbers may be used. The card 11 is here illustrated with a slot 13 that is used to encode the number 83 on the card. The center of gravity of the slotted card is illustrated as at 14. It should be noted that the center of gravity is displaced from the geometric center of gravity 15 before slotting of the card 11. It will be shown later how this affects the linearity of the number scale 12.

Figure 3:
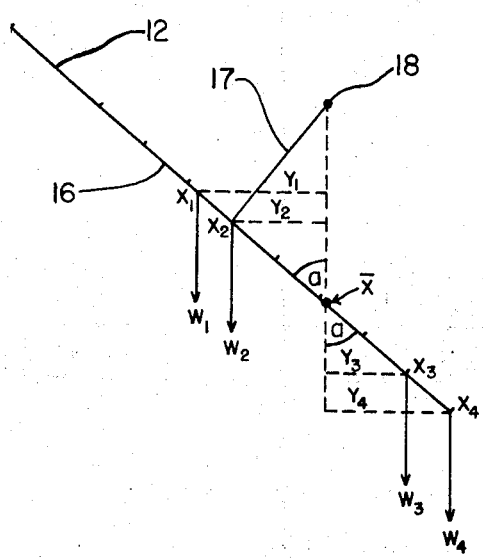
FIG. 3 is a moment drawing illustrating the manner in which an equilibrium position of the axle is reached depending upon the composite center of gravity of the cards.

In the practice of this invention, numerical data is encoded on various cards 11 by forming slots which will hold the card rigidly on the axle such that the relative positions of the pivotal point and the center of gravity are substantially as illustrated in FIG. 3. A group of cards is then gathered and hung, by means of their slots 13, upon the axle 5. Due to the fact that all of the cards have the same weight, the moment arms of the various cards, depending upon the distance between the slot 13 and the center of gravity 14, will cause the axle 5 to rotate until the composite center of gravity of the cards lies in the vertical plane passing through the axis of axle 5. At this time, the position of the pointer 9 may be observed and the numerical average of the numbers encoded on the cards 11 may be read along the averaging scale 8.

The theory of operation of this invention can be understood with reference to FIG. 3 where the averaging device is schematically illustrated as being a series of weights W suspended from an elongated rigid support 16. The support 16, in turn, is held adjacent its midportion by a crank 17 perpendicular to the support 16 journaled for rotation at one of its ends 18, where the support and crank have zero mass. When the system comes to rest, the sum of moments about the pivot point 18 will be zero, and therefore:

$$W_1Y_1 + W_2Y_2 = W_3Y_3 + W_4Y_4 \quad (1)$$

However, since all of the weights W represent similar cards of equal mass:

$$W_1 = W_2 = W_3 = W_4 \quad (2)$$

Therefore:

$$Y_1 + Y_2 = Y_3 + Y_4 \quad (3)$$

From the geometry shown by the dotted lines in FIG. 3, it is readily apparent that:

$$Y_1 = (\overline{X} - X_1) \sin a \quad (4a)$$
$$Y_2 = (\overline{X} - X_2) \sin a \quad (4b)$$
$$Y_3 = (X_3 - \overline{X}) \sin a \quad (4c)$$
$$Y_4 = (X_4 - \overline{X}) \sin a \quad (4d)$$

By substituting equations 4a, 4b, 4c and 4d into equation 3 and simplifying, the following expression is obtained:

$$\overline{X} = \frac{X_1 + X_2 + X_3 + X_4}{4} \quad (5)$$

It may be seen from the derivation that the distance from the point of intersection of crank 17 and support 16 to the weight must be linearly related to the numerical difference between an arbitrarily assigned number for the midpoint of the numerical scale 12 and the number represented by the weight. More simply, a linear scale may be positioned anywhere along the support 16 and the relative numerical values of the equal weights read therefrom.

Figure 4:
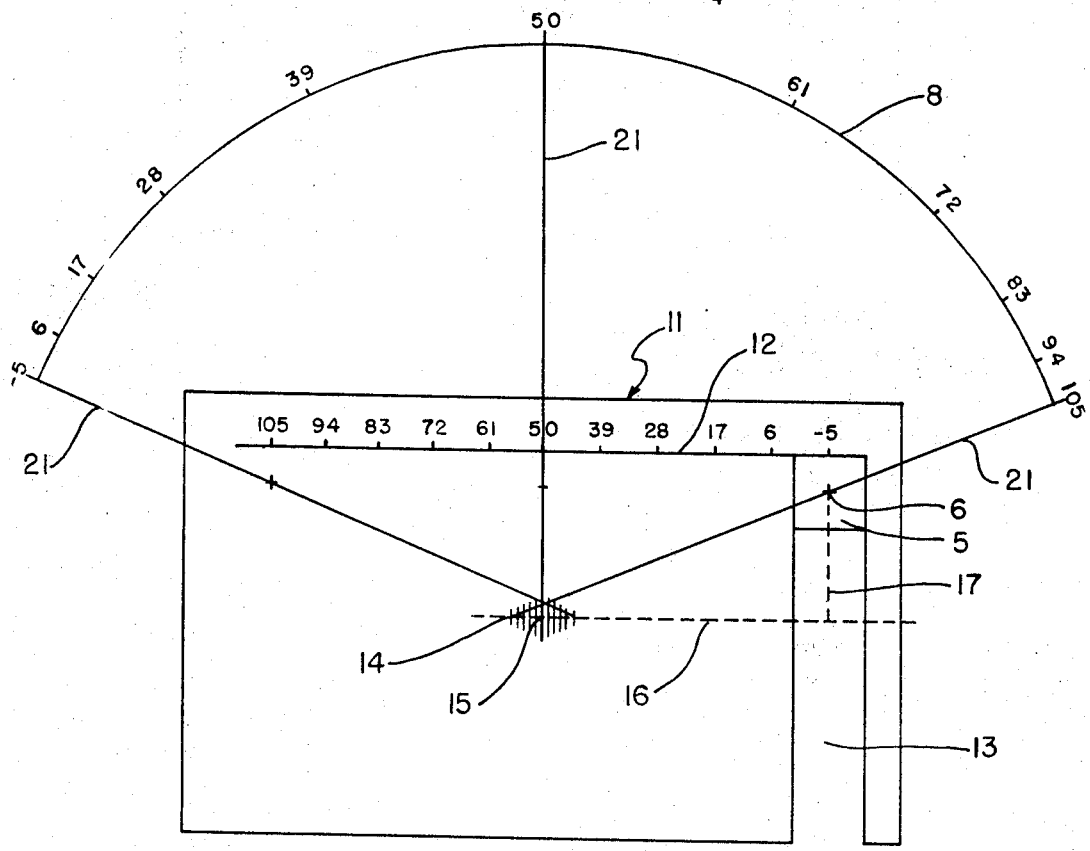
FIG. 4 is a schematic representation illustrating the method of generating the averaging scale associated with this invention.

The method by which a suitable numerical scale 12 on the card 11 and an averaging scale 8 on the front support 2 may be generated can be understood with reference to FIG. 4. FIG. 4 is similar to FIG. 3 except that a card 11 has been substituted for the support 16, the crank 17, and the weights W—W of FIG. 3. The card 11 as shown in FIG. 4 has been slotted to record the numerical value of −5. The card 11 had an initial center of gravity 15, but after the slot was placed in the card, the center of gravity shifted to a different point 14. When the card 11 is engaged with the axle 5, it will be understood that the point about which the card pivots will be equivalent to pivot point 18 in FIG. 3, that the support 16 of FIG. 3 is schematically illustrated by the dashed line 16 in FIG. 4, and that the crank 17 of FIG. 3 is schematically illustrated by the dashed line 17 of FIG. 4. Thus, it can be understood that each card acts as its own support 16 and crank 17.

To generate the numerical scale 12 and the averaging scale 8, a number of lines 21 are drawn. These lines are drawn for each principal numerical division of the numerical scale 12 by passing a line through the calculated pivot point 18 for any given value and the calculated center of gravity 14 for the same assumed value inserted in the card. Note that the center of gravity 14 will be offset from the geometric center 15 of the card 11 a different amount for each numerical value due to the fact that cutting a slot in the card removes a portion of the mass and will shift the center of gravity. It may be seen that the introduction of slot 13 into the card shifts the center of gravity from the geometric center 15 to a position 14 farther from the slot 13. It may readily be shown that the displacement of the center of gravity is given by the expression:

$$\Delta d = \frac{m}{M}(d)$$

where:
$\Delta d \cong$ displacement of the center of gravity
$m \cong$ mass of material cut to form slot
$M \cong$ mass of card after slot is cut
$d \cong$ distance from the midpoint of the number scale 12 to the number punched into the card scale, or the distance from the original center of gravity of the card to the midpoint of the slot.

Since the ratio of the masses of various portions of the card equals the ratio of the areas of these same portions:

$$\Delta d = \frac{a}{A} d$$

where $a \cong$ area of slot and $A \cong$ area of card after slot is cut.

The displacement results in a somewhat nonlinear number scale 12 and averaging scale 8 since $d$ is different for each number appearing on the number scale. In the particular example illustrated by FIG. 4, $a/A$ is arbitrarily established to be approximately 0.1, which results in a $d$ of 5 mm. for a $d$ of 50 mm. It has been shown that the numerical value of the weight (card) depends on its position along a support 16, shown as an imaginary line in FIG. 4, relative to the intersection of the support 16 and the crank 17 (assigned a value of 50 arbitrarily). This distance for the card pictured in FIG. 4 slotted at −5 is 55 mm. which would place the center of gravity 14 of the card 11 at a value of −5 units if each mm. is one unit. It is readily understood that as one moves the slot toward the median position of the card scale, $\Delta d$ diminishes to zero for all $a/A$ values, but the scale is uniquely determined by the card-slot area ratio. There will be a slight vertical displacement of the center of gravity, but if the slot is cut substantially as shown, it is negligible; furthermore, it is the same for all numbers entered.

Figure 5:
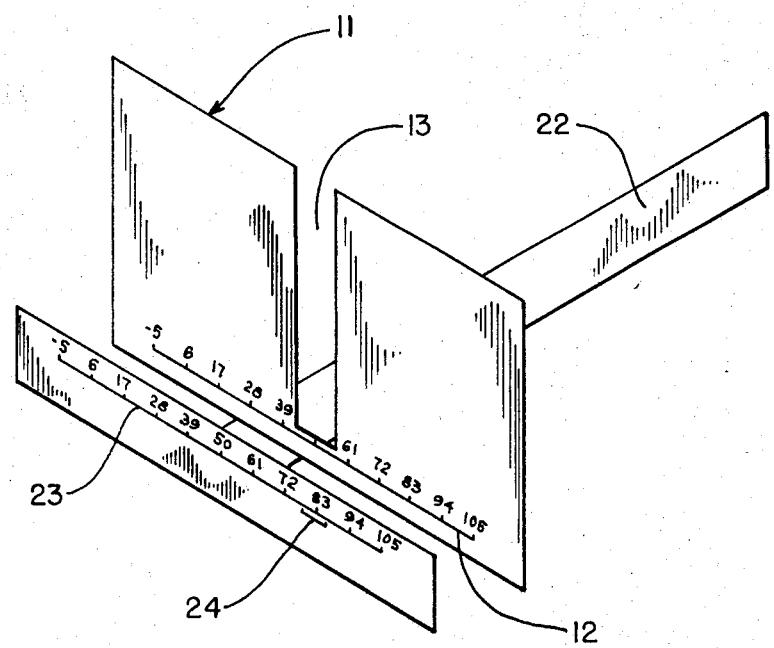
FIG. 5 is a perspective view of a fulcrum arrangement which will allow the rapid separation of cards into those above and those below an average value.

FIG. 5 shows a simple fulcrum arrangement 22 where a scale 23 is rigidly attached at right angles to and at one end of the fulcrum. It is necessary that the fulcrum 22 be centered on the scale 23 as shown. The slot 13 in the card 11 is centered above an "example average" 24. It may readily be seen that if the scale 23 is identical to the card scale 12, the cards which represent numbers greater than the "example average" 24 will fall to the left of the fulcrum 22 and those cards which represent numbers less than the "example average" 24 will fall to the right of the fulcrum 22.

It will be seen from the drawings and the accompanying description that the method and apparatus of this invention conveniently may be used by teachers to determine from a number of individual grades received by a student in a period of time the average grade of the student for that period. The numerical grade for each test, recitation or the like is encoded on a single card, and at any given time the accumulated cards may be inserted into the apparatus whereupon the average grade will be indicated on the meter. In addition, the device of this invention is also useful in determining the average deviation of a group of grades or individual grade averages for purposes of establishing alphabetical grades from numerical grades. To do this, the cards bearing the encoded information may be separated into the group of cards representing the numbers above the determined average and a group of cards representing the numbers below that average. If the distribution is normal, the average deviation may be obtained by averaging either subgroup, and taking the difference between the overall average and the average of the subgroup. The average deviation may be related to the standard in a normal distribution, and, as such, is useful in establishing alphabetical grades from numerical grades. The averarge deviation is also useful for establishing the precision of any group of measurements.

Several equivalent configurations are also capable of performing the functions of the device of FIG. 4. For example, the scale might be mounted on the axle for rotation under a fixed pointer. Such a configuration would be convenient with a rotating wheel on which equal weights are hung along a line in the plane of the wheel located such that no point on the line coincides with the center of the wheel. However, there is an obvious practical limitation on the number of entries which can be made. Also, there is no permanent record, and numbers must be entered in the same fashion as with conventional calculators.

An alternate method for suspending the weights might be to provide a hook capable of engaging the axle firmly and free to engage the cards firmly at any position along its edge. This arrangement would allow a linear card scale if the weight distribution of the hooks were symmetrical about the axle.

Another alternative is to cut out equal portions of a card (suspending the card such that it is free to rotate about its center of gravity) such that the cut out portions are equivalent to equal weights suspended as shown in FIG. 4. This method of entering numbers allows several entries to be made on one card, but it has the disadvantage of requiring a relatively small moment to overcome friction.

It will also be understood by those skilled in the art that, in addition to the scale and pointer system illustrated in the drawings, other mechanical, electrical, and optical readout systems can be utilized, and it is intended that they be included within the scope of this invention.

I claim:

1. A device for calculating averages comprising:
   a horizontally disposed axle mounted for rotation about its axis and indicating means, including a numerical scale, functionally associated with the axle to indicate the angular position of the axle, the composite center of gravity of the indicating means and axle means lying along the axis of rotation;
   a plurality of weights of equal mass being provided with attachment means for functionally engaging the axle in such a manner that:
      when initially engaged with the axle, the center of gravity of each of the weights is below the axis of rotation; and
      the center of gravity of each weight is fixedly positioned with respect to the axis of rotation at any selected distance from the vertical plane containing the axis of rotation; and
   whereby, when so loaded with a plurality of such weights, the axis will rotate until the composite center of gravity of the weights lies below the axis of rotation and in the vertical plane containing the axis of rotation.

2. A device according to claim 1 wherein the weights of equal mass are rectilinear planer devices slotted at selected portions to enable positioning the weights with their center of gravity at any selected distance from the vertical plane containing the axis of rotation.

3. A device according to claim 2 wherein the weights are fixedly positioned with respect to the axis of rotation by making the slots with a geometry that mates with the cross section of the axle whereby the weights are prevented from rotating with respect to the axle.

UNITED STATES PATENT OFFICE
CERTIFICATE OF CORRECTION

Patent No. 3,537,642　　　　　　　　　Dated November 3, 1970

Inventor(s)　William Laurita

It is certified that error appears in the above-identified patent and that said Letters Patent are hereby corrected as shown below:

Column 3 - Equation (4c) should read:

$$Y_3 = (X_3 - \bar{X}) \sin a$$

Column 4, line 66:　"averarge" should read -average-

Column 6, line 17:　"planer" should read -planar-

SIGNED AND
SEALED
FEB 9 1971

FEB. 9, 1971

(SEAL)
Attest:

Edward M. Fletcher, Jr.
Attesting Officer

WILLIAM E. SCHUYLER, JR.
Commissioner of Patents